United States Patent [19]

Brociner

[11] Patent Number: 4,948,664

[45] Date of Patent: Aug. 14, 1990

[54] PAPER AND COATING COMPOSITION FOR USE IN GRAVURE PRINTING

[75] Inventor: Ronald E. Brociner, St. Austell, United Kingdom

[73] Assignee: English China Clays Lovering Pochin & Company Limited, Great Britain

[21] Appl. No.: 408,470

[22] Filed: Sep. 15, 1989

Related U.S. Application Data

[63] Continuation of Ser. No. 427,424, Sep. 29, 1982, abandoned, which is a continuation-in-part of Ser. No. 188,089, Sep. 17, 1980, abandoned.

[30] Foreign Application Priority Data

Sep. 19, 1979 [GB] United Kingdom ................. 7932458

[51] Int. Cl.[5] ........................ B32B 19/04; B32B 29/04; C09C 1/28; C09C 1/42

[52] U.S. Cl. .................................... 428/331; 106/482; 106/487; 106/499; 428/342; 428/452; 428/454; 428/511; 428/514; 428/537.5; 524/447; 524/451

[58] Field of Search ............... 428/331, 511, 514, 342, 428/452, 454, 537.5; 524/447, 451; 106/214, 482, 487, 499

[56] References Cited

U.S. PATENT DOCUMENTS 2,524,816 10/1950 Lyons .................................. 106/312

3,876,443 4/1975 Conley et al. ........................ 106/306

FOREIGN PATENT DOCUMENTS 1246778 9/1971 United Kingdom .

OTHER PUBLICATIONS

Hagemeyer, R. W. (editor) *Paper Coating Pigments*, Tappi Monograph Series No. 38, Appleton, Wisconsin, Graphic Communications Center, 1976, pp. 178, 183–185.

*Primary Examiner*—Evan Lawrence

*Attorney, Agent, or Firm*—Klauber & Jackson

[57] ABSTRACT

A paper and coating composition for use in gravure printing. The paper is coated with the composition which includes a pigment containing a layer lattice silicate which has a relatively narrow range of particle size distribution compared with pigments of conventional paper coating compositions, and which includes not more than 5%, by weight, of particles which have an equivalent spherical diameter of less than 0.25 microns. Gravure printing utilizing such paper gives good results even when the coating weight of the composition is relatively low. Furthermore, good results can be achieved when the composition includes a significant proportion of relatively coarse particles.

23 Claims, 2 Drawing Sheets

PAPER AND COATING COMPOSITION FOR USE IN GRAVURE PRINTING

This application is a continuation, of application Ser. No. 427,424, filed Sep. 29, 1982 now abandoned, which is a continuation-in-part of application Ser. No. 188,089, filed Sep. 17, 1980, now abandoned.

FIELD OF THE INVENTION

This invention relates to printing, to paper suitable for use in a gravure printing process, and to a coating composition to such paper.

BACKGROUND OF THE INVENTION

Gravure printing is a form of intaglio printing, i.e. printing which uses a plate or cylinder into the surface of which the subject matter to be printed is etched or engraved. A liberal film of fluid printing ink is supplied to the whole printing surface and the surface is then wiped, for example by a doctor blade, in order to remove all the ink from the unindented parts of the surface leaving ink only in the indentations or cells. Paper in a continuous web or in separate sheets is then pressed into contact with the inked surface in order to receive an impression of the subject matter.

In the most widely used kind of gravure printing, which is known as the rotogravure process, the subject matter, which may be textual or pictorial, is etched into the printing surface in the form of a matrix of cells which vary in depth and/or in surface area, so that the cells corresponding to the darker parts of the subject matter have a greater capacity for ink than the cells which correspond to the lighter parts of the subject matter. An image of the subject matter is formed by a photographic process on a sheet of carbon tissue which is impregnated with gelatine containing a light sensitive reagent. There is first formed on the sheet of carbon tissue a rectilinear grid having from 59 to about 160 lines to the centimeter. The grid is formed by placing a screen consisting of small opaque squares separated by fine transparent lines in contact with the impregnated carbon tissue and exposing the screen to light so that the gelatine in the tissue immediately below the lines is rendered insoluble.

The image of the subject matter to be printed is then superimposed on the image of the screen by placing in contact with the carbon tissue a positive photographic transparency of the subject matter for the colour to be printed, and exposing the transparency to light. Again the gelatine in areas of the carbon tissue lying immediately beneath clear areas of the transparency is rendered insoluble and in other areas the solubility of the gelatine is inversely proportional to the amount of light transmitted by the transparency. The carbon tissue is then placed over the surface of a specially prepared copper roller, those parts of the gelatine which are still soluble are washed away, and the surface of the roller is etched with a suitable reagent such as ferric chloride. The result is that the surface of the cylinder is etched in a pattern composed of a very large number of cells defined by a rectilinear grid, the depth of the cells in a particular area being dependent on the solubility of the gelatine in the carbon tissue overlying that area and thus on the amount of light transmitted through the transparency in that area.

The choice of a suitable paper for gravure printing is largely empirical. Results can be obtained on a wide variety of different types of paper ranging from newsprint to the finest matt art paper. However as a general rule, the paper should be absorbent enough to take the ink without the exertion of undue pressure, and a coated paper is generally required for the best results.

the gravure printing process is especially suitable for printing runs in which a large number of copies are required because the recessed cells of a gravure cylinder are less subject to wear through abrasion than the relief type of the letterpress process.

The process is therefore used for printing magazines, mail order catalogues and other periodical publications having a large circulation. There is an increasing trend to print this type of publication on a lightweight coated paper in order to minimise postal costs. Unfortunately a very common defect which appears when subject matter is printed by gravure on lightweight coated papers is a speckled effect which is most noticeable in the middle tones. This effect is caused by poor contact between the surface of the paper and the surface of the cylinder so that the ink is not drawn out from some of the cells with the result that some of the minute dots which make up the printed image are missing.

Accordingly, the present invention arose from a need to provide a new pigment for lightweight coated magazine paper for printing by gravure only. The objective was to maximise print quality by gravure, while enabling magazine publishers to reduce the weight per page of their publications. It was and still is believed that the weight of the main body of the paper has reached its lower limit and that any further reduction would make the paper too weak. It was consequently hoped that the desired weight reduction could be achieved by reducing the coating weight. However, previous experiments has shown that a reduction in the coating weight invaribly resulted in a marked deterioration in gravure repreduction quality. The accepted minimum coating weights for satisfactory gravure reproduction were around 9 or 10 grams per square meter ($g/m^2$).

In his research, the present inventor started from the basis that good quality printing in gravure requires a compressible paper, which would more reliably contact the printing cylinder over its entire area and so ensure that the maximum possible ink pick-up from the cylinder was achieved. The present inventor investigated whether this compressibility could be introiduced into the coating layer by using, as a pigment, a clay having a narrower particle size distribution than occurs naturally. The basis for this was that a restricted particle size distribution would result in poor packing characteristics with a consequent high void content, giving the required compressibility. This approach was a departure from conventional thinking which was that the paramount requirement for good printing by gravure methods was a smooth surface, which implied high gloss. Gloss is improved by reducing the size of the particles composing the pigment. Conventional thinking, therefore, was that acceptable coatings for gravure printing had to be made from pigments containing fine particles.

The inventor unexpectedly discovered, in accordance with the present invention, that clays with narrower particle size distribution gave surprisingly and unexpectedly good gravure reproduction at normal coating weights; and, more surprisingly, that by utilising such a clay, good gravure reproduction was maintained with coating weights as low as 7 $g/m^2$. Another surprising result was that good reproduction was obtained in the presence of significant proportions of relatively large particles, (i.e. greater than 10 microns). This was in complete contrast to the prevailing belief that, as the particle size of the pigment increased above 5 microns equivalent spherical diameter, the gravure print quality deteriorated. This surprising ability to achieve satisfactory printing results using coarser particles is of major importance for the commercial prospects of the present invention. It means that the cost of the processing necessary to produce a good quality product can be reduced by using a coarser pigment fraction than is normally considered suitable for the production of pigments for paper coating compositions for gravure printing paper.

DISCUSSION OF THE PRIOR ART

U.S. Pat. No. 2,524,816 (Lyons) discloses a clay product for paper coating and a method of treating clay to obtain the product. The treatment comprises the removal of substantially all relatively coarse particles (i.e. greater than 3 microns) and substantially all relatively fine particles (i.e. less than 0.25 microns). The objective of Lyons was to improve the appearance of the paper, but not to improve the quality of printing when the paper was printed by gravure. Indeed, Lyons is not concerned with, and makes no reference to, gravure printing. Lyons improve the quality of the paper by removing those particles which give rise to objectionable properties. Thus, Lyons teaches the removal of coarse particles, which would improve gloss, and the removal of fine particles, which, with the crude clays used by Lyons, would improve whiteness and lower viscosity. This is because the finer fraction of the crude clays used by Lyons would have contained iron and titanium oxides, which impart a dark colouration to the kaolin, and bentonite, which has an adverse effect on rheological properties. Lyons in no way teaches that the manipulation of the range of particle sizes in clay can have a beneficial effect on gravure print quality when printing takes place onto paper coated with a composition containing the clay as pigment.

SUMMARY OF THE INVENTION

For the purpose of defining the present invention, the concept of a particle size range factor (PSRF) has been devised to provide an indication of the range of particle sizes in the pigment as a function of the median particle size. It is defined as follows:

$$PSRF = \frac{e.s.d._{90\%} - e.s.d._{10\%}}{e.s.d._{50\%}}$$

where $e.s.d._{90\%}$, $e.s.d._{10\%}$ and $e.s.d._{50\%}$ are the equivalent spherical diameters below which fall 90%, 10% and 50% respectively of the particles, by weight.

By the "equivalent spherical diameter" of a particle in an aqueous suspension of a particulate solid material, we mean the diameter of a sphere which, according to Stokes'Law, would fall through a given vertical distance in the suspension at a given temperature in the same time as the particle. The equivalent spherical diameters, $e.s.d_{90\%}$, $e.s.d._{50\%}$ and $e.s.d._{10\%}$, are determined by measuring the percentages by weight of the particles in the particlate solid material which are smaller than a series of equivalent spherical diameters and by plotting a graph with the logarithm of the equivalent spherical diameter as the abscissa and "% by weight finer than " as the ordinate. Two different methods are used for determining the "% by weight finer than" according to the magnitude of the equivalent spherical diameter. When the equivalent spherical diameter is in the range from 0.25 micron to 4 microns the Andreasen method is used. In this method a fully deflocculated, dilute suspension of the particulate mateiral is homogenised and then allowed to sediment for a time in which, according to Stokes' Law, all particles having an equivalent spherical diameter larger than the value under consideration will have fallen below a given depth in the suspension. The suspension remaining above the given depth is sampled and, from the percentage by weight of particles in this sample and in the original homogenised suspension, the percentage by weight of particles smaller than the equivalent spherical diameter is calculated. When the equivalent spherical diameter is in the range from 4 microns to 40 microns a repeated decantation technique is used. A fully deflocculated, dilute suspension of the particulate material is homogenised and then allowed to sediment for a time in which, according to Stokes' Law, all particles having an equivalent spherical diameter larger than the value under consideration will have fallen below a given depth in the suspension. At the end of this time the suspension remaining above the given depth is discarded and the suspension below the given depth is diluted with water containing deflocculant to the original volume. The suspension is thoroughly mixed and the operations of sedimenting for the given time, discarding the supernatant liquid and diluting the suspension below the given depth to the original volume are repeated until no particles remain in the supernatant liquid. From the percentages by weight of particles in the final suspension below the given depth and in the original homogenised suspension, the percentage by weight of particles larger than the equivalent spherical diameter is calculated and the percentage by weight smaller than the equivalent spherical diameter found by difference.

According to one aspect of the present invention, there is provided a method of gravure printing comprising printing by means of a gravure process onto paper coated with a composition including a pigment consisting predominantly of a layer lattice silicate, wherein the layer lattice silicate has a particle size range factor (as hereinbefore defined) which is less than 3, and wherein not more than 5% of the particles, by weight, have an equivalent spherical diameter which is less than 0.25 microns.

According to another aspect of the present invention, there is provided a paper coating composition including a pigment consisting predominantly of a layer lattice silicate, wherein the layer lattice silicate has a particle size range factor (as hereinbefore defined) which is less than 3, wherein not more than 5% of the particles, by weight, have an equivalent spherical diameter which is less than 0.25 microns, and wherein at least 5% of the particles by weight, have an equivalent spherical diameter which is not less than 10 microns.

According to another aspect of the present invention, there is provided a paper coating composition including a pigment consisting predominantly of a layer lattice silicate, wherein the layer lattice silicate has a particle size range factor (as hereinbefore defined) which is less than 3, wherein not more than 5% of the particles, by weight, have an equivalent spherical diameter which is less than 0.25 microns, and wherein at least 5% of the partilces by weight, have an equivalent spherical diameter which not less than 10 microns.

A paper coating composition in accordance with the invention may include a pigment consisting predominantly of a layer lattice silicate, such as a kaolinitic clay or talc, wherein the layer lattice silicate has a particle size range factor (as hereinbefore defined) which is less than 2 and wherein not more than 5% of the particles, by weight, have an equivalent spherical diameter which is less than 0.25 microns.

The method of the invention may utilise a paper in which at least 5% of the particles of the pigment, by weight, have an equivalent spherical diameter which is nto less than 10 microns. At least 40% of the particles of the pigment, by weight, may have an equivalent spherical diameter which is not less than 3 microns.

Some pigments for use in the method, the paper and/or the composition of the present invention may have a particle size range factor of less than 2, or less than 1.5.

The coating composition may be coated onto the paper with a coating weight of less than 10 grams per square meter or of not more than 9 grams per square meter.

As stated, a pigment in accordance with the invention consists predominantly of a layer lattice silicate. Preferably, the layer lattice silicate constiututes at least 70% of the pigment, and it may constitute substantially the whole of the pigment.

The present invention is based on the discovery that the "printability" of a coated paper by gravure methods can be significantly enhanced by reducing the range of particle sizes in the pigment, and by reducing the proportion of finer particles.

Thus, when a graph is plotted with the logarithm of the equivalent spherical diameter as the abscissa and "% by weight finer than" as the ordinate, the central portion of the resulting sigmoid curve is steeper for a pigment in accordance with the present invention than it is for a conventional pigment and the length of the "tails" of the curve, especially that at the fine particle size end is reduced as compared with the case for conventional pigments.

By the length of the tails of the curve we mean the distance over which the flatter top and bottom portions of the sigmoid curve approach the "100% by weight finer than" and the "0% by weight finer than" ordinates respectively. The pigment having a particle size distribution of reduced range may be produced, for example, by subjecting a wider-range grade of the layer lattice silicate to one or more additional particle size separations, or by grinding a coarse residue grade of the layer lattice silicte with a particulate grinding medium in aqueous suspension, or by a combination of these methods.

The additional particle size separations will generally be such as to remove the finest particles in the distribution of particle sizes. For example, in many cases good results are obtained if substantially all particles having an equivalent spherical diameter smaller than 0.25 microns are removed. The particle size separations may be performed by gravitiational sedimentation of a deflocculated aqueous suspension of the layer lattice silicate, but since a very long time is required to effect a separation at such a fine particle size by this method it is convenient to use a centrifuge such as a scroll discharge centrifuge or a nozzle discharge disc centrifuge.

The particle size separations may also serve to remove substantially all particles larger than, say, 5 microns or 2 microns.

The grinding of the coarse residue grade of the layer-lattice silicate is conveniently performed using a particlate grinding medium. The coarse residue grade of the mineral material generally contains less than 20% by weight of particles having an equivalent spherical diameter smaller than 2 microns.

The layer lattice silicate is most preferably a kaolinitic clay but alternatively talc, or a mixture of talc and kaolinitic clay, may be used. The layer lattice silicate preferably has a particle size distribution such that substantially all the particles are smaller than 50 microns.

BRIEF DESCRIPTION OF THE DRAWINGS

The invention is illustrated by the following Examples, in which reference is made to the accompanying Figures. In these Figures.

DETAILED DESCRIPTION FO THE INVENTION WITH REFERENCE TO EXAMPLES

Clay "A" was prepared by subjecting a deflocculated aqueous suspension of raw clay from Cornwall to a particle size separation to remove substantially all particles larger than 50 microns.

The particle size distribution of Clay "A" may be indicated by the following parameters:

| | |
|---|---|
| % by weight larger than 10 microns equivalent spherical diameter (e.s.d) | 6% |
| % by weight smaller than 2 microns e.s.d. | 46% |
| % by weight smaller than 1 micron e.s.d. | 31% |
| $e.s.d_{90\%}$ | 8.3 microns |
| $e.s.d._{50\%}$ | 2.25 microns |
| $e.s.d._{10\%}$ | 0.38 microns |
| PSRF | 3.52 |

Clay "B" was prepared by subjecting Clay "A" in a deflocculated aqueous suspension to a second particle size separation in a nozzle discharge disc centrifuge to remove substantially all particles smaller than 0.25 micron.

The particle size distribution of Clay "B" may be indicated by the following parameters:

| | |
|---|---|
| % by weight larger than 10 microns e.s.d. | 5% |
| % by weight smaller than 2 microns e.s.d. | 44% |
| % by weight smaller than 1 micron e.s.d. | 22% |
| $e.s.d._{90\%}$ | 7.0 microns |
| $e.s.d._{50\%}$ | 2.35 microns |
| $e.s.d._{10\%}$ | 0.63 microns |
| PSRF | 2.72 |

Clay "C" was prepared by subjecting a coarse, residue kaolin to attrition grinding in aqueous suspension with silica sand of grain size 0.5–1.0 mm. The suspension of ground kaolin was deflocculated and subjected to a particle size separation in a nozzle discharge disc centrifuge to remove substantially all of the particles having an equivalent spherical diameter smaller than 0.25 micron. The suspension of kaolin, free from ultrafine particles, was then flocculated and dewatered by filtration, and the filter cake was pugmilled.

The particle size distribution of Clay "C" may be indicated by the following parameters:

| | |
|---|---|
| % by weight larger than 10 microns e.s.d. | 5% |
| % by weight smaller than 2 microns e.s.d. | 39% |
| % by weight smaller than 1 micron e.s.d. | 20% |
| $e.s.d._{90\%}$ | 7.1 microns |
| $e.s.d_{50\%}$ | 2.65 microns |
| $e.s.d._{10\%}$ | 0.56 microns |
| PSRF | 2.47 |

Figure 1:
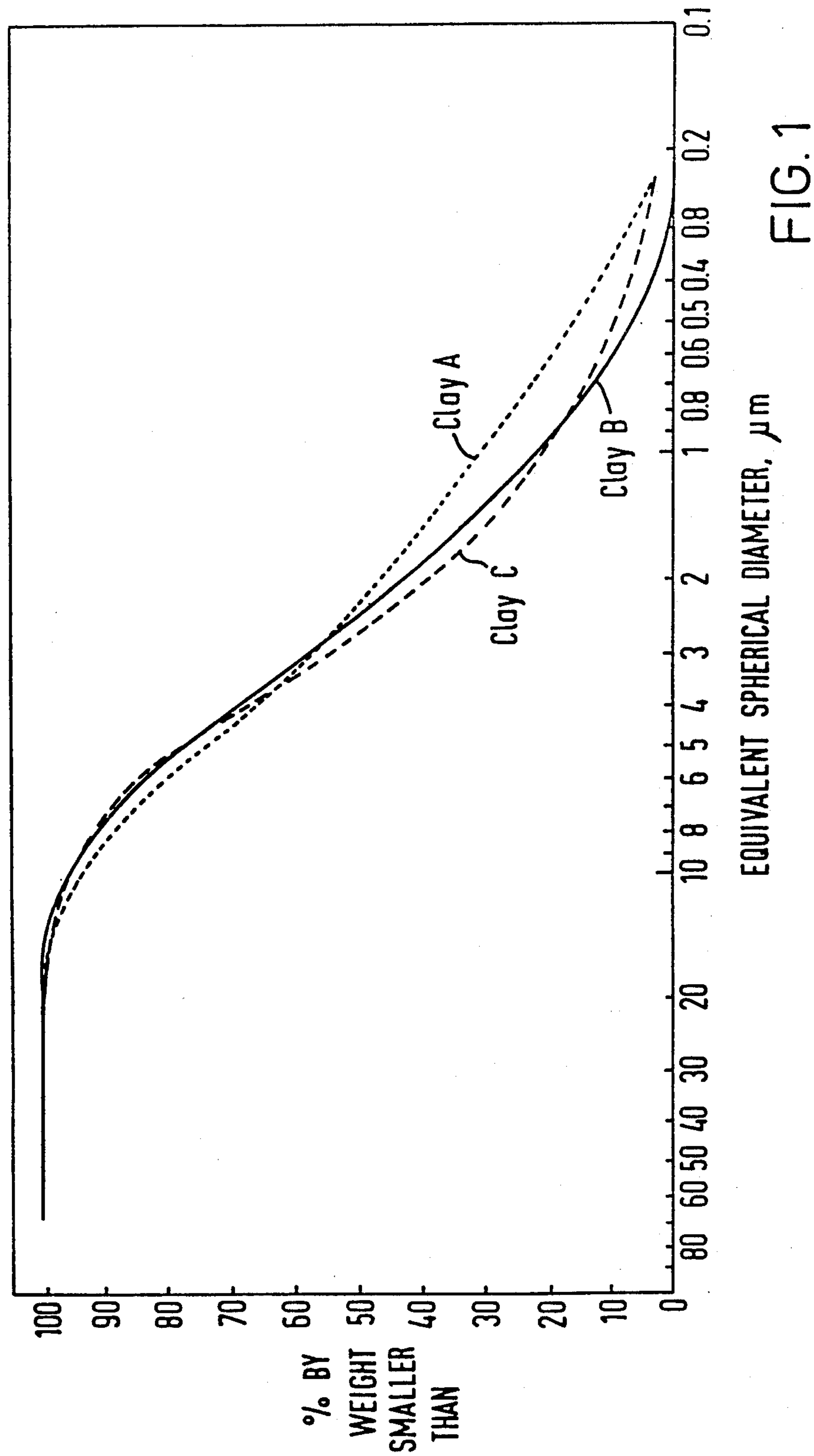
FIG. 1 shows particle size distribution curves for three kaolinitic clays "A", "B" and "C"
Figure 2:
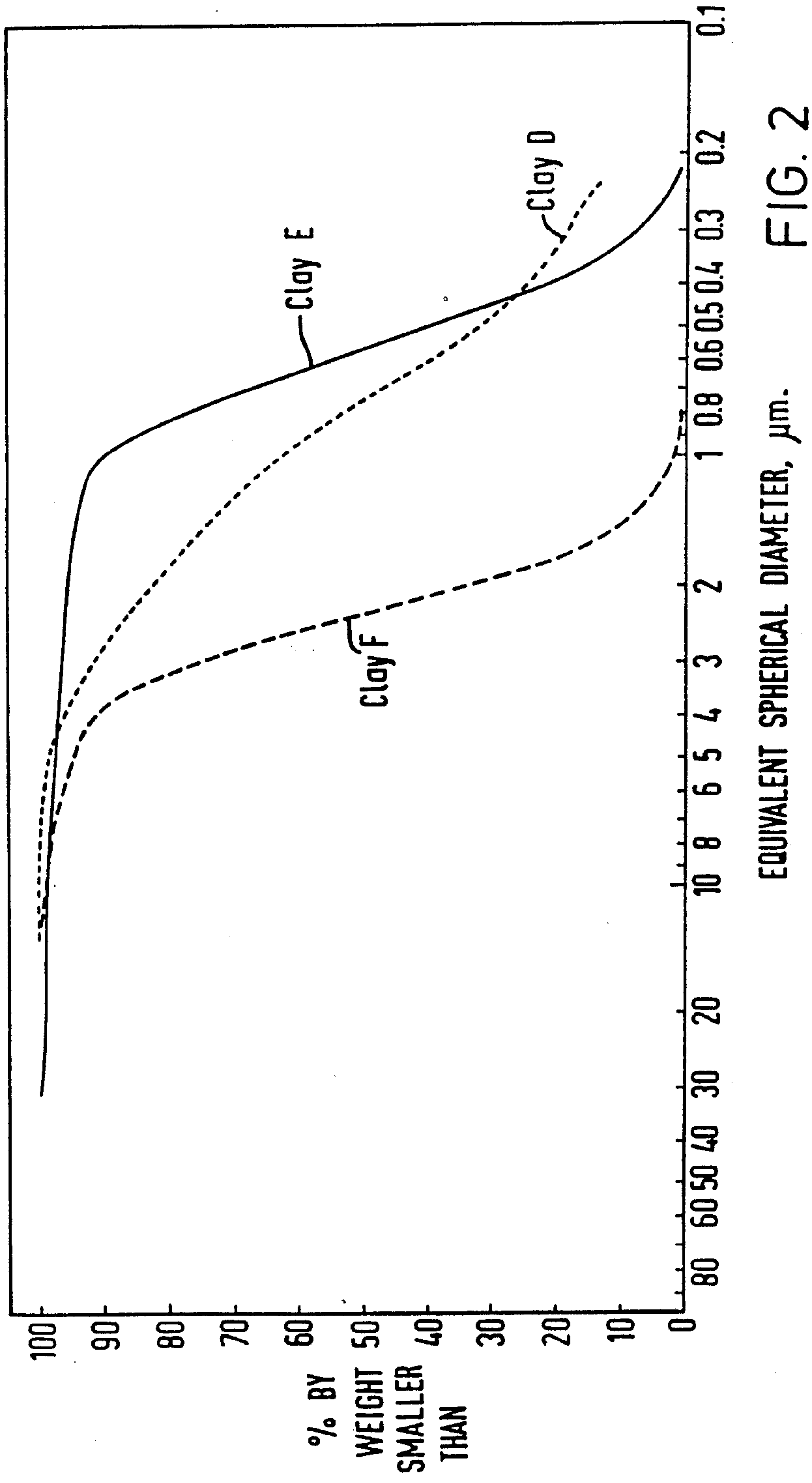
FIG. 2 shows particle size distribution curves for three further kaolinitic clays "D", "E" and "F".

It can be appreciated from FIG. 1 that the sigmoid curve for Clay "A" is flatter than those for Clays "B" and "C". This is reflected by the fact that the PSRF for Clay "A" is greater than 3 whereas those for Clays "B" and "C" is less than 3. Furthermore, it will be observed that Clays "B" and "C" have 5% of particles greater than 10 microns which, following conventional thinking, would make them unsuitable as pigments for coating papers destined for use in a gravure printing process. This is because it would be thought that the presence of the relatively coarse particles would make the resulting paper too rough to produce satisfactory printing results. Another factor indicating the relative coarseness of Clays "B" and "C" is that, in each of these clays (as can be deduced from FIG. 1) more than 40%, and in particular, between 40% and 50% of the particles are greater than 3 microns.

Clay "D" was prepared by subjecting a clay of the same type as Clay "A" to a particle size separation in deflocculated aqueous suspension in a scroll discharge centrifuge in order to remove substantially all particles having an equivalent spherical diameter larger than 5 microns.

The particle size distribution of Clay "D" may be indicated by the following parameters:

| | |
|---|---|
| % by weight larger than 5 microns e.s.d. | 1% |
| % by weight smaller than 2 microns e.s.d | 83% |
| % by weight smaller than 1 micron e.s.d. | 64% |
| $e.s.d._{90\%}$ | 2.6 microns |
| $e.s.d._{50\%}$ | 0.74 microns |
| $e.s.d._{10\%}$ | 0.2 microns |
| PSRF | 3.24 |

Clay "E" was prepared by subjecting Clay "C" to a first particle size separation in deflocculated aqueous suspension in a scroll discharge centrifuge to remove substantially all particles having an equivalent spherical diameter larger than 2 microns and then to a second particle size separation in a nozzle discharge disc centrifuge to remove substantially all particles having an equivalent spherical diameter smaller than 0.25 micron.

The particle size distribution of Clay "E" may be indicated by the following parameters:

| | |
|---|---|
| % by weight smaller than 2 microns e.s.d. | 95% |
| % by weight smaller than 1 micron e.s.d. | 92% |
| % by weight smaller than 0.25 micron e.s.d. | 3% |
| $e.s.d._{90\%}$ | 0.96 microns |
| $e.s.d._{50\%}$ | 0.55 microns |
| $e.s.d._{10\%}$ | 0.32 microns |
| PSRF | 1.16 |

Clay "F" was prepared by subjecting Clay "D" in deflocculated aqueous suspension to a particle size separation in a scroll discharge centrifuge to remove substantially all particles having an equivalent spherical diameter smaller than 1 micron.

The particle size distribution of Clay "F" may be indicated by the following parameters:

| | |
|---|---|
| % by weight larger than 5 microns e.s.d. | 5% |
| % by weight smaller than 2 microns e.s.d. | 35% |
| % by weight smaller than 1 micron e.s.d | 1% |
| $e.s.d._{90\%}$ | 3.7 microns |
| $e.s.d._{50\%}$ | 2.3 microns |
| $e.s.d._{10\%}$ | 1.5 microns |
| PSRF | 0.96 |

It will be appreciated that Clays "E" and "F" have relatively low PSRF's, (these being in each case less than 1.5).

A further Clay "G" was prepared as follows: A suspension of a coarse residue kaolin was subjected to attrition grinding to give a comminuted product having a particle size distribution such that 11% by weight consisted of particles having an equivalent spherical diameter larger than 10 microns and 28% by weight consisted of particles having an equivalent spherical diameter small than 2 microns. The suspension of the comminuted product was screened through a No. 300 mesh B.S. sieve (nominal aperture 53 microns), diluted to a solids content of 14.6% by weight, treated with sufficient sodium hudroxide to raise the pH to 8.0 and with 0.3% by weight, based on the weight of dry kaolin, of a sodium polyacrylate dispersing agent in order to deflocculate the kaolin, and passed through a scroll discharge centrifuge at a flow rate such that substantially all particles having an equivalent spherical diameter smaller than 0.25 micron were separted from the suspension. The coarser product from the centrifuge was then diluted with water, flocculated with sulphuric acid, dewatered by filtration and thermal drying to a moisture content of about 25% by weight and subjected ot pugmilling. The pugmilled kaolin was designated "Clay G".

The particle size distribution of Clay "G" may be indicated by the following parameters:

| | |
|---|---|
| % by weight larger than 10 microns e.s.d. | 6% |
| % by weight smaller than 2 microns e.s.d. | 32% |
| % by weight smaller than 1 micron e.s.d. | 14% |
| $e.s.d_{90\%}$ | 8.0 microns |
| $e.s.d_{50\%}$ | 3.2 microns |
| $e.s.d._{10\%}$ | 0.84 micron |
| PSRF | 2.24 |

As a further example, talc was beneficiated by crushing, grinding, froth flotation to remove magnesite, further grinding in the wet state in ball mills, classification in hydraulic cyclones, filtration, drying and final comminution in a fluid energy mill to give a product having the following particle size parameters:

| | |
|---|---|
| % by weight larger than 10 microns e.s.d. | 9% |
| % by weight smaller than 2 microns e.s.d. | 32% |
| % by weight smaller than 1 micron e.s.d. | 13% |
| $e.s.d._{90\%}$ | 9.3 microns |
| $e.s.d_{50\%}$ | 3.25 microns |
| $e.s.d._{10\%}$ | 0.82 microns |
| PSRF | 2.61 |

Like Clays "B" and "C", Clay "G" and the talc have relatively coarse compositions, more than 5% of their particles being larger than 10 microns.

For the purposes of comparison, a further clay was prepared using a typical United States clay (designated U.S. No. 2) as starting material. This clay was treated to produce a particle size distribution approximating that disclosed in U.S. Pat. No. 2,524,816 (Lyons). It was, however, found to be impossible to reproduce exactly the particle size distribution disclosed for the treated U.S. No. 2 clay. It is assumed that the raw clay of Lyons underwent something in the region of ten separation steps to achieve the treated clay-a process which would make the treated clay prohibitively expensive.

Each clay was incorporated in turn into a paper coating composition prepared according to the following recipe:

| Ingredient | Parts by weight |
|---|---|
| Clay | 100 |
| Sodium polyacrylate dispersing agent | 0.3 |
| Self-thickening acrylic copolymer latex adhesive | 4.8 |

Sodium hydroxide to pH 9
Water to a viscosity of 1500 centipoise as measured on a Brookfield viscometer at 100 rpm.

The beneficiated talc was mixed with water containing, as dispersing agents for the talc, 0.5% by weight, based on the weight of talc, of sodium hexametaphosphate and 2.0% by weight, based on the weight of talc, of the nonionic, low-foaming surfactant known as "PLURONIC L62" (Trade Mark of Wyandotte Chemicals Corporation). "PLURONIC L62" has hydrophilic portion consisting of polyethylene oxide groups and a hydrophobic portion consisting of a polyoxypropylene base of approximated molecular weight 1750. The proportion of polyethylene oxide groups is approximately 20% by weight based on the weight of the polyoxypropylene base.

In order to form a paper coating composition the deflocculated suspension talc was mixed with 4.8 parts by weight of a self-thickening acrylic copolymer latex adhesive per hundred parts of talc and sufficient sodium hydroxide to raise the pH to 9. The paper coating composition contained 54.9% by weight of solids and had a viscosity of 680 centipoise at 22° C. as measured on a Brookfield viscometer at 100 rpm.

Each coating composition was coated at various different coating weights on to a lightweight coating base paper using a laboratory coating maching of the type described in Brithish patent specification No. 1,032,536 running at a speed of 750 meters per minute for compositions containing Clays A to F and of 400 metres per minute for compositions containing Clay "G" and beneficiated talc. The batches of coated paper were calendered with 10 passes at a line pressure of 375 lb. per linear inch (67 kg. per cm.) and at 65° C.

Small samples were cut from each batch of coated paper and were tested for gravure printing quality on a Winstone gravure proofing press as described in the article "Realistic paper tests for various printing processes" by A. Swan published in "Printing Technology" Vol 13, No. 1, Apr. 1969, pages 9–22. The Winstone proofing press comprises a rotating printing cylinder on which are etched an area which will print solid black and two areas which will print a light grey tone, these last two areas differing in the etching process which is used. The proofing press is also provided with a pan for ink, a doctor blade, an impression cylinder, means for pressing the impression cylinder against the printing cylinder, means for drying the printed impression and feed and take-up rolls for a web of backing paper.

The pan for ink may be raised by a lever mechanism to bring the ink contained in the pan into contact with the lower part of the printing cylinder. The doctor blade has a thickness of 0.13 mm, projects 5.0 mm beyond a supporting backing blade and is mounted in a position such that, as the printing cylinder rotates, it wipes away all the ink from the unindented parts of the surface of the cylinder leaving ink only in the cells. The ink used is based on xylene and should have a viscosity such that a standard Ford No. B4 flow cup viscometer empties in 50 seconds. The impression cylinder is covered with rubber of 65° Shore hardness and is pressed against the printing cylinder by a small pneumatic ram operating at a pressure of 60 psig (414 kPa).

The small samples of coated paper are attached by adhesive tape to the web of backing paper which passes from the feed roll, through the nip between the printing cylinder and the impression cylinder, under a radiant heat dryer and over a jet of warm air to dry the printed impression before reaching the take-up roll.

In operation, enough of the backing paper is unrolled to feed through the complete assembly to the take-up roll. This length is normally 3 meter and a line is drawn on the backing roll in this position. Starting from the line, positions for mounting the sample of paper are market off using a template which ensures that the samples are spaced at distances equal to the circumference of the printing cylinder so that each recieves an identical impression. The samples of paper are mounted on the backing paper which is wound back on to the feed roll. The free end of the backing paper is threaded through the assembly to the take-up roll and the line drawn on the backing paper is registered to a reference line on the printing cylinder.

The printing and impression cylinders are then set into rotation unitl all the samples of paper have printed. The printed samples are compared with reference samples which are graded from 1 to 7 according to the degree of speckle or the number of missing dots per square centimeter. Grade 1 is the best result and grade 7 the worst.

From samples of paper coated at different coat weights for each of the eight pigments the results corresponding to coat weights of 8 $g.m^{-2}$ and 10 $g.m.^{-2}$ were found by interpolation The results are set forth in the following Table.

TABLE

| Material | Print grade at 8 $g.m.^{-2}$ coat weight | Print grade at 10 g.m.−2 coat weight |
|---|---|---|
| Clay A | 4½ | 3 |
| Clay B | 1½ | 1 |
| Clay C | 2 | 1½ |
| Clay D | 3½ | 2 |
| Clay E | 1½ | 1 |
| Clay F | 2 | 1 |
| Clay G | 1½ | 1½ |
| Beneficiated Talc | 1½ | 1½ |
| U.S. No. 2 (treated) | 5 | 2.¼ |

It will be seen that in each case paper coated with the clays according to the invention "B", "C", "E", "F", "G" and with beneficiated talc gives gravure prints having fewer missing dots per square centimetre than paper coated with clays "A" and "D", and the improvement is especially noticeable at the lighter coat weight.

Another noticeable result in the above table is the poor printing quality obtained using the treated U.S. No. 2 clay as the pigment. This reinforces the belief that Lyons is not concerned with gravure printing. Furthermore, it indicates that a researcher attempting to use the treatment method of Lyons without an appreciation of the principles underlying the present invention would not meet with success in applying the Lyons disclosure to gravure printing.

It is not at present clear to us why Clays "B", "C", "E", "F", and "G" and the beneficiated talc give better results than Clays "A" and "D". The presently preferred theory, however, is that Clays "B", "C", "E", "F" and "G" and the beneficiated talc provide a more compressible coating than Clays "A" and "D", and this results in better take-up of ink from the cells of the etched cylinder. The compressibility is a result of the relatively poor packing characteristics of Clays "B", "C", "E", "F" and "G" and the beneficiated talc which in turn is a consequence of the uniform particle size distribution of these materials.

I claim:

1. Paper provided with a coating composition comprising a pigment and an adhesive binder, the pigment consisting of a layer lattice silicate selected from the group consisting of kaolinitic clays, talc, and mixtures thereof, wherein the layer lattice silicate has a particle size range factor which is less than 3, wherein not more than 5% of the particles, by weight, have an equivalent spherical diameter which is less than 0.25 microns, and wherein at least 5% of the particles by weight, have an equivalent spherical diameter which is not less than 10 microns.

2. Paper as claimed in claim 1, wherein at least 40% of the particles by weight have an equivalent spherical diameter which in not less than 3 microns.

3. Paper provided with a coating composition comprising a pigment and an adhesive binder, the pigment consisting of a layer lattice silicate selected from the group consisting of kaolinitic clays, talc, and mixutures thereof, wherein the layer lattice silicate has a particle size range factor which is less than 2, and wherein not more than 5% of the particles, by weight, have an equivalent spherical diameter which is less than 0.25 microns.

4. Paper provided with a coating composition comprising a pigment and an adhesive binder, the pigment consisting of a layer lattice silicate selected from the group consisting of kaolinitic clays, talc, and mixtures thereof, wherein the layer lattice silicate has a particle size range factor which is less than 2, and wherein at least 5% of the particles, by weight, have an equivalent spherical diameter which is less than 0.25 microns, the coating weight of the composition being less than 10 grams per square mater.

5. Paper as claimed in claim 4, wherein the coating weight of the composition is not greater than 9 grams per square meter.

6. Paper provided with a coating composition comprising a pigment and an adhesive binder, the pigment consisting of a layer lattice silicate selected from the group consisting of kaolinitic clays, talc, and mixtures thereof, wherein the layer lattice silicate has a particle size range factor which is less than 2, and wherein at least 5% of the particles, by weight, have an equivalent spherical diameter which is not less than 10 microns, and wherein not more than 5% of the particles, by weight, have an equivalent spherical diameter which is less than 0.25 microns, the coating weight of the composition being less than 10 grams per square meter.

7. Paper as claimed in claim 6, wherein the coating weight of the composition is not greater than 9 grams per square meter.

8. Paper provided with a coating composition comprising a pigment and an adhesive binder, the pigment consisting of a kaolinitic clay having a particle size range factor which is less than 3, and wherein not more than 5% of the particles, by weight, have an quivalent spherical diameter which is less than 0.25 microns, and wherein at least 5% of the particles by weight, have an equivalent spherical diameter which is not less than 10 microns.

9. Paper provided with a coating composition comprising a pigment and an adhesive binder, the pigment consisting of a kaolinitic clay having a particle size range factor which is less than 2 and wherein not more than 5% of the particles, by weight, have an equivalent spherical diameter which is less than 0.25 microns.

10. A paper provided with a coating composition as in claim 9, wherein the coating weight of the composition is less than 10 grams per square meter.

11. A paper provided with a coating composition as in claim 10, wherein at least 5% of the particles, by weight, have an equivalent spherical diameter which is not than 10 microns.

12. Paper provided with a coating composition comprising a pigment and an adhesive binder, substantially the whole of the pigment being a layer lattice silicate selected from the group consisting of kaolinitic clays, talc, and mixtures thereof, wherein the layer lattice silicate has a particle size range factor which is less than 1.5, and wherein not more than 5% of the particles, by weight, have an equivalent spherical diameter which is less than 0.25 microns.

13. Paper provided with a coating composition comprising a pigment and an adhesive binder, substantially the whole of the pigment being talc, wherein the talc has a particle size range factor which is less than 3, wherein not more than 5% of the particles, by weight, have an equivalent spherical diameter which is less than 0.25 microns, and wherein at least 5% of the particles by weight, have an equivalent spherical diameter which is not less than 10 microns.

14. Paper provided with a coating composition comprising a pigment and an adhesive binder, substantially the whole of the pigment being talc, wherein the talc has a particle size range factor which is less than 2, and wherein not more than 5% of the particles, by weight, have an equivalent spherical diameter which is less than 0.25 microns.

15. Paper provided with a coating composition comprising a pigment and an adhesive binder, substantially the whole of the pigment being talc, wherein the talc has a particle size range factor which is less than 2, and wherein at least 5% of the particles, by weight, have an equivalent spherical diameter which is less than 0.25 microns, the coating weight of the composition being less than 10 grams per square meter.

16. A paper coating composition comprising a pigment and an adhesive binder, the pigment consisting of a layer lattice silicate selected from the group consisting of kaolinitic clays, talc, and mixtures thereof, wherein the layer lattice silicate has a particle size range factor which is less than 3, wherein not more than 5% of the particles, by weight, have an equivalent spherical diameter which is less than 0.25 microns, and wherein at least 5% of the particles by weight, have an equivalent spherical diameter which is not less than 10 microns.

17. A paper coating composition as claimed in claim 16, wherein at least 40% of the particles by weight have an equivalent spherical diameter which is not less than 3 microns.

18. A paper coating composition comprising a pigment and an adhesive binder, pigment consisting of a layer lattice silicate selected from the group consisting of kaolinitic clays, talc, and mixtures thereof, wherein the layer lattice silicate has a particle size range factor which is less than 2, and wherein not more than 5% of the particles, by weight, have an equivalent spherical diameter which is less than 0.25 microns.

19. A paper coating composition comprising a pigment and an adhesive binder the pigment consisting of a kaolinitic clay having a particle size range factor which is less than 3, wherein not more than 5% of the particles, by weight, have an equivalent spherical diameter which is less than 0.25 microns, and wherein at least 5% of the particles by weight, have an equivalent spherical diameter which is not less than 10 microns.

20. A paper coating composition comprising a pigment and an adhesive binder, the pigment consisting of a kailinitic clay having a particle size range factor which is less than 2, and wherein not more than 5% of the particles, by weight, have an equivalent spherical diameter which is less than 0.25 microns.

21. A paper coating composition comprising a pigment and an adhesive binder, substantially the whole of the pigment being a layer lattice silicate selected from the group consisting of kaolinitic clays, talc, and mixtures thereof, wherein the layer lattice silicate has a particle size range factor which is less than 1.5, and wherein not more than 5% of the particles, by weight, have an equivalent spherical diameter which is less than 0.25 microns.

22. A paper coating composition comprising a pigment and an adhesive binder, substantially the whole of the pigment being talc, wherein the talc has a particle size range factor which is less than 3, wherein not more than 5% of the particles, by weight, have an equivalent spherical diameter which is less than 0.25 microns, and wherein at least 5% of the particles, by weight, have an equivalent spherical diameter which is not less than 10 microns.

23. A paper coating composition comprising a pigment and an adhesive binder, substantially the whole of the pigment being talc, wherein the talc has a particle size range factor which is less than 2, and wherein not more than 5% of the particles, by weight, have an equivalent spherical diameter which is less than 0.25 microns.

* * * * *